United States Patent Office 3,519,332
Patented July 7, 1970

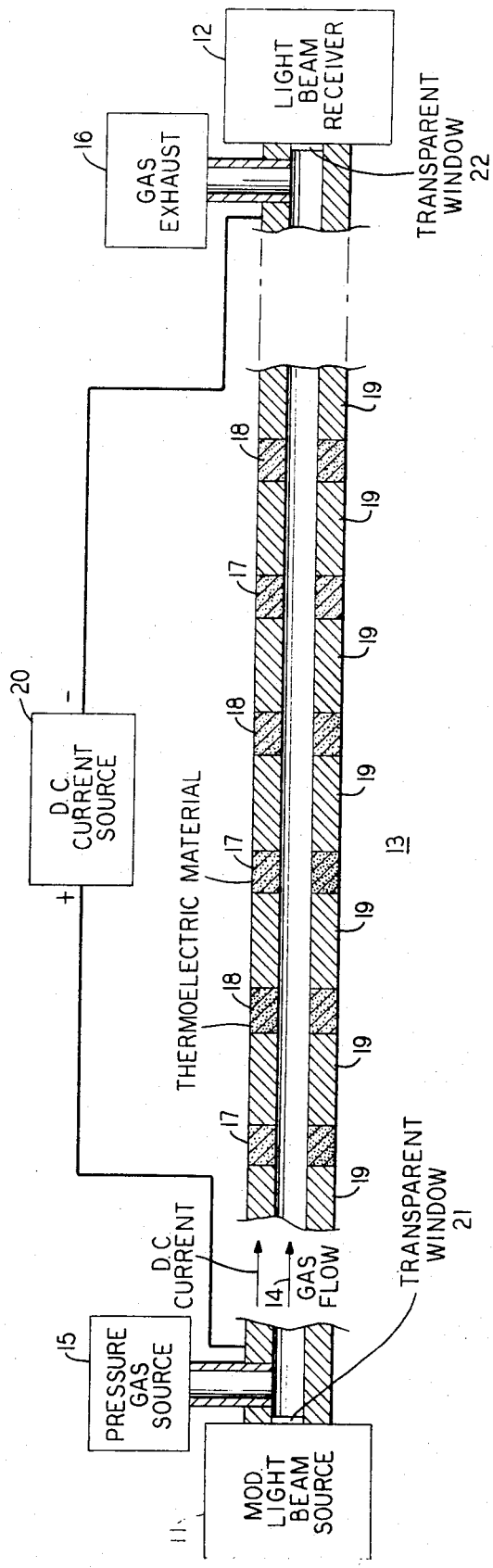

3,519,332
THERMOELECTRIC ALTERNATING-GRADIENT OPTICAL GUIDING APPARATUS
Peter Kaiser, Matawan Township, Monmouth, N.J., assignor to Bell Telephone Laboratories, Incorporated, Murray Hill and Berkeley Heights, N.J., a corporation of New York
Filed Feb. 7, 1968, Ser. No. 703,742
Int. Cl. G02b 1/06
U.S. Cl. 350—179                                4 Claims

ABSTRACT OF THE DISCLOSURE

Alternating-gradient gas lens focusing of light beams is obtained with improved efficiency in a suitable conduit containing a flowing gas by employing Peltier heating. Short tubular sections of p-type and n-type thermoelectric material, for example, bismuth telluride, are arranged alternately and spaced by sections of copper tubing to form the conduit; and a common current flow is established through the thermoelectric elements and the copper sections.

BACKGROUND OF THE INVENTION

This invention relates to optical guiding apparatuses, particularly those employing gas lens focusing effects.

Optical transmission systems for the purpose of communication with modulated beams of coherent light have been proposed in a variety of configurations. Among the more interesting of these systems are the ones employing optical guiding and focusing in a gaseous medium. It has been found that the gaseous medium will typically have lower optical loss than a solid medium or a series of high quality, anti-reflection-coated solid lenses.

In a gas lens optical guiding apparatus, the focusing effect depends upon the establishment of a region, at or near the axis of the conduit, where relatively cool gas is surrounded by warmer gas. In this region, the cool gas has a higher density and a higher index of refraction at locations on or near the axis of the conduit than the warmer gas at radial positions farther removed from the axis within that region. Typically, heat is applied from an external electrical source at spaced intervals along the conduit; and cooling of the gas is accomplished intermediate those spaced locations by heat exchange with the ambient environment. It should, of source, be apparent that a continuing application of heat at various locations along the conduit without cooling therebetween would eventually make it impossible to have a relatively cool region of gas near the axis of the conduit. The temperature of the gas would continue to rise as it propagated along the conduit.

Heating accomplished by an electrical resistance heating coil or by heat exchange from a hot fluid will hereinafter be called Joule heating.

Two arrangements of alternating heating and cooling along the conduit are possible. In the first cooling is accomplished only to a degree which establishes substantial uniformity of temperature in the cross section of the gas. In this version, any significant diverging lens effect between the converging lens regions is avoided. In the other version, cooling is accomplished to a greater degree; and a diverging lens effect occurs in the cooling regions. By appropriate spacing of the converging lens and diverging lens regions, an alternating-gradient focusing system is obtained. Even with like focusing and defocusing powers of the alternating converging and diverging lenses, a net focusing effect can be achieved. For example, see the articles by S. E. Miller, "Alternating-Gradient Focusing and Related Properties of Convergent Lens Focusing," Bell System Technical Journal, volume 43, page 1741 (July 1964) and D. Marcuse, "Properties of Periodic Gas Lenses," Bell System Technical Journal, volume 44, pages 2083–2116 (November 1965).

For either the prior art alternating-gradient gas lens systems or the prior art all-convergent gas lens systems, the power consumption for a coast-to-coast communication link employing such a system with Joule heating would be comparable to the power consumption of a fair-sized city. Although such a communication link might nonetheless be cheaper than existing communication links for sufficiently high volumes of communication traffic, it is desirable to have an alternative with improved power efficiency.

SUMMARY OF THE INVENTION

I have discovered that surprisingly high power efficiency is obtained in a gas lens optical guiding apparatus by employing Peltier heating. Moreover, short tubular sections of p-type and n-type thermoelectric material are readily integrated into the conduit, for example, between sections of copper tubing. Therefore, a very simple finished structure is obtained. The current flow is established in one direction directly through an appropriate length of conduit.

My invention is employed to best advantage in an alternating-gradient gas lens focusing apparatus; but an all-convergent version of my invention can also be more efficient than prior art all-convergent gas lens apparatuses.

BRIEF DESCRIPTION OF THE DRAWING

Other features and advantages of my invention will become apparent from the following detailed description, taken together with the drawing, in which the sole figure is a partially pictorial cross-sectional view and a partially block diagrammatic illustration of an illustrative embodiment of my invention.

DESCRIPTION OF ILLUSTRATIVE EMBODIMENT

In the embodiment of the drawing, it is desired to communicate information between two stations by means of a modulated beam of coherent light. For example, at one station, there is a modulated light beam source 11, which acts as the transmitter; and at the other station, there is a light beam receiver 12, which demodulates the light beam to produce the output information signal.

The information-modulated light beam is coupled from source 11 into a conduit 13 containing a suitable gaseous medium 14, such as carbon dioxide or air. Coupling is accomplished through a suitable transparent window 21 between source 11 and conduit 13. Similarly, at the other end of conduit 13, the modulated light beam is coupled from the gaeseous medium in conduit 13 into the receiver 12 through another transparent window 22. The gas is supplied in conduit 13 from a suitable pressurized gas source 15 through a suitable opening and is exhausted through an opening of the conduit into a suitable gas exhaust 16, typically at atmospheric pressure. The flow rate of the gas is illustratively just sufficient to establish stable laminar flow conditions and is dependent on the internal transverse dimensions of conduit 13. The internal transverse dimensions of conduit 13 are always many times the wavelength of the light to be transmitted. In this case, the conduit is circular in cross section with an internal diameter of a quarter of an inch (¼) and an outside diameter of 0.706 inch. The corresponding gas flow rate past any particular point in the conduit in an illustrative specific embodiment is 1.5 liters per minute.

The conduit 13 comprises spaced tubular sections 17 of n-type thermoelectric material and spaced sections 18 of p-type thermoelectric material, the sections 18 being in staggered or alternating arrangement with respect to the sections 17. Soldered between the spaced sections 17 and 18 are the sections 19 of copper tubing. The length of the copper sections 19 is illustratively six inches and the length of both n-type elements 17 and p-type elements 18 is three-quarters of an inch (¾). These dimensions are taken to be illustrative only and are not necessarily optimum values.

Hot and cold copper sections 19 will alternate along the conduit. The hot copper sections and thermoelectric elements may be enclosed by heat insulating material (not shown), for example urethane foam, and, for purposes of structural strength and protection from physical damage, surrounded by a larger tube. The cold copper sections may be in direct contact with the low temperature heat sink (not shown), which is preferably at ambient temperature.

The n-type thermoelectric sections 17 are illustratively bismuth telluride ($Bi_2Te_3$) doped with copper iodide (CuI); and the p-type thermoelectric sections 18 are $Bi_2Te_3$ doped with lead (Pb). The doping levels may be any doping levels typical of such elements employed in thermoelectric refrigeration devices, now well known in the refrigeration art. A direct current flow is supplied through an appropriate length of the conduit 13, illustratively by connecting the positive terminal of a direct current source 20 to a section of copper tubing adjacent to source 11 and the negative terminal of source 20 to a section of copper tubing adjacent to receiver 12. For a temperature difference between hot and cold junctions of 50 degrees centigrade and for an air flow rate of 1.5 liters per minute, a current of approximately 27 amperes is appropriate. The voltage needed to establish this current flow depends upon the resistivity of the sections 17, 18 and 19 and the contact resistance of the soldered joints.

In operation, a coherent beam of light is modulated by a suitable modulator, for example, an electro-optic modulator, in source 11. The beam is then transformed to match the mode desired in the gaseous medium in conduit 13. Although the beam will tend to diverge according to the laws of diffraction, the beam encounters a converging focusing effect at points where heat is being transferred to the moving gaseous medium from the conduit 13 and encounters diverging focusing effects where heat is being transferred from the gaseous medium to the conduit 13.

Heat is generated at the interface between a section of copper tubing 19 and an n-type thermoelectric section 17 when the current is flowing from the copper to the thermoelectric material. Correspondingly, heat is absorbed at the interface between the n-type material and the copper when the current flows from the n-type material to the copper. A cold junction is again obtained at an interface between a section 19 of copper tubing and a section 18 of p-type material when the current flows from the copper to the p-type material. Correspondingly, a hot junction is obtained at the interface between the p-type material and the copper when the current flows from the p-type material to the copper. Thus, it will be seen that, at one section 19 of copper tubing, heat is absorbed at both ends while, at the next section 19, heat is generated at both ends. In both bases the temperature distribution along the copper tubing is essentially uniform, due to the high heat conductivity of copper. The gas becomes appreciably warmed; and the focusing effect increases as the gas passes through the hot tubing. Of course, it may be perceived that, if the section 19 of copper tubing is too long, then even the portion of the gas near the axis of the conduit will become appreciably warmed; and no additional focusing occurs. Thus, there is obviously an optimum length for the sections 19 of copper tubing given the other dimensions of the apparatus and the desired temperature rise.

When the gas encounters the next succeeding cold copper tubing, its outer portions are cooled; and, after a certain transition region, a diverging focusing effect occurs. Thus, a series of converging and diverging lenses is obtained. These lenses are, in effect, equivalent to thin lenses and are of acceptable quality for moderate temperature rises and for laminar flow of the gas. For spacings of these lenses slightly less than twice their identical focal lengths, a net focusing effect for the entire conduit is obtained; and this is also true if the diverging lens is weaker than the converging lens.

Thus, the modulated light beam is periodically refocused and kept away from the walls of the conduit 13. Except for slight scattering losses, which are virtually negligible, and mode conversion losses, which are a function of lens aberrations, the modulated light beam will eventually reach receiver 12 and be demodulated.

If the cold sections are held at ambient temperature $T_a$ and the Joule losses in the copper tubings are kept small in comparison to the losses in the thermoelectric material, then the temperature difference $\Delta T$ between the hot and cold junctions is approximately given by $$\Delta T = I \frac{QT_a + \frac{l}{2k_eA}I}{\frac{kA}{l} + \frac{ChL}{2} - QI} \quad (1)$$

I is the direct current flowing through the system, Q is the thermoelectric power of the junction (typical value 0.2 mv./° C.), $l$ is the length of one thermo-element, and L is the length of one copper tube, A is the cross-sectional area, C the circumference, and $k_e$ and $k$ are the electric and thermal conductivity of the thermo-elements, respectively $$\left(\text{typical values } 10^3 \frac{1}{\text{ohm cm.}}, 0.0145 \text{ w/cm. °C.}\right)$$

The total surface heat transfer coefficient of the heat insulated hot section is $h$. In my experiments, typical values for $h$ were of the order of 0.8 to 1.0 mw./cm.$^2$ °C. for airflow rates of 1.5 liter/min. and urethane insulation.

A power efficiency advantage over Joule heating apparatuses was obtained for temperature differences $\Delta T$ less than approximately 40° centigrade. The foregoing results should not be construed to imply that my experiments employed an optimum design. In general, an optimum voltage across the thermo-elements and an optimum area-to-length ratio of the thermo-elements can be selected, so that the temperature difference $\Delta T$ for a given electric power supplied is maximized. It is believed that an advantage over Joule heating can be achieved with existing materials in a range of temperature differences between hot and cold sections up to approximately 50° centigrade. Improvements in materials enabling wider ranges from which the parameters of Equation 1 can be selected might yield a power efficiency advantage over Joule heating for temperature differences up to about 100° centigrade.

The volume of the thermoelectric material in sections 17 and 18 may be reduced until contact resistance losses become a significant fraction of the Joule losses in the thermoelectric material.

It can be shown that best over-all operation is obtained if the cold junction is held at the substantially constant temperature of a low temperature heat sink, preferably a readily available ambient temperature of the apparatus. This may be accomplished by bringing a large heat sink or heat exchange vane into intimate thermal contact with the cold section of copper tubing.

The improved efficiency, as compared to Joule heating, is the consequence of the different thermodynamic processes involved. In the case of Peltier heating, a substantial amount of heat may be transferred from a cold junction to a hot junction with an amount of electric input power which is small in comparison to the amount of heat transferred. In essence, this cooperation is similar to that obtained in a thermoelectric refrigerator, with the difference that the heat produced in the thermo-element adds to the efficiency in the case of heating and is detrimental for cooling purposes.

An important aspect of my discovery is that an optical guiding apparatus employing Peltier heating can actually provide a significant advantage over apparatuses employing Joule heating in a substantial range of temperature differences between the hot and cold conduit sections.

Various modifications of my invention are possible. For example, a plurality of direct current sources may be employed to supply the current needed in different sections of the conduit, as is convenient from the standpoint of practical fabrication and installation. Various soldering and joining techniques may be employed to ease the problems of longitudinal thermal expansion and contraction at the junctions between copper tubing and thermoelectric material. For example, corrugated-spring joining sections are feasible. Nevertheless, it may be more practical to bury the conduit in the earth to a depth at which only very small ambient temperature changes are obtained.

In order to increase the range of temperature differences in which an efficiency advantage is obtained over Joule heating, it is feasible to employ several thermoelectric-to-thermoelectric sections of like type in series before contacting a copper section. The temperature rise or drop is divided among the series thermoelectric sections. The increase in temperature difference for a given efficiency is not proportional to the number of series sections and is relatively modest.

Furthermore, the gas may be periodically introduced and exhausted along the conduit. It should also be apparent that, when the direction of current flow is reversed in the embodiment of the drawing, the temperature distribution along the conduit 13 will be reversed. The hot junctions become cold junctions and vice versa.

What is claimed is:

1. Apparatus for guiding a beam of optical electromagnetic radiation, comprising a conduit of transverse dimensions substantially greater than the wavelength of radiation to be propagated therein, said conduit containing a gas in which said radiation is to be propagated, and thermoelectric means for heating and cooling different portions of said gas along said conduit for focusing said radiation, said thermoelectric means comprising a plurality of n-type thermoelectric elements forming sections of said conduit, a plurality of p-type thermoelectric elements forming sections of said conduit in alternating arrangement with respect to said n-type thermoelectric elements, said conduit comprising a plurality of sections of electrically and thermally conductive tubing spacing each of said n-type and p-type elements from the others of said elements, and means for supplying a direct current to flow through said n-type elements, p-type elements and conductive sections of said conduit in series.

2. Apparatus according to claim 1 in which the direct current supplying means supplies current of a magnitude to make a plurality of said conductive sections hotter than the remainder of said conductive sections in an alternating arrangement by an amount between zero degrees centigrade and approximately 100 degrees centigrade.

3. Apparatus according to claim 2 in which the direct current supplying means supplies current of a magnitude to make the plurality of said conductive sections hotter than the remainder of said conductive sections by an amount between zero degrees centigrade and approximately 50 degrees centigrade.

4. Apparatus for guiding a beam of optical electromagnetic radiation, comprising a conduit of transverse dimensions substantially greater than the wavelength of radiation to be propagated therein, said conduit containing a gas in which said radiation is to be propagated, and common thermoelectric means for simultaneously heating and cooling different portions of said gas along said conduit, said common thermoelectric means including hollow elements of thermoelectric materials of at least two types disposed in alternating positions along and forming part of the conduit, the remainder of said conduit comprising electrically and thermally conductive material electrically and thermally connected with said thermoelectric materials to form thermoelectric junctions therewith, and means for flowing a direct current through said conduit.

References Cited

UNITED STATES PATENTS 3,410,627   11/1968   Berreman et al. _____ 350—179

JOHN K. CORBIN, Primary Examiner